US010204299B2

(12) United States Patent
Chandraker et al.

(10) Patent No.: US 10,204,299 B2
(45) Date of Patent: Feb. 12, 2019

(54) UNSUPERVISED MATCHING IN FINE-GRAINED DATASETS FOR SINGLE-VIEW OBJECT RECONSTRUCTION

(71) Applicant: NEC Laboratories America, Inc., Princeton, NJ (US)

(72) Inventors: Manmohan Chandraker, Santa Clara, CA (US); Angjoo Kim, Cupertino, CA (US)

(73) Assignee: NEC Corporation (JP)

( * ) Notice: Subject to any disclaimer, the term of this patent is extended or adjusted under 35 U.S.C. 154(b) by 175 days.

(21) Appl. No.: 15/342,766

(22) Filed: Nov. 3, 2016

(65) Prior Publication Data

US 2017/0124433 A1    May 4, 2017

Related U.S. Application Data

(60) Provisional application No. 62/250,860, filed on Nov. 4, 2015.

(51) Int. Cl.
*G06K 9/00* (2006.01)
*G06N 3/04* (2006.01)
*G06F 17/30* (2006.01)
*G06T 7/33* (2017.01)
*G06T 7/50* (2017.01)

(52) U.S. Cl.
CPC ......... *G06N 3/04* (2013.01); *G06F 17/30247* (2013.01); *G06N 3/0454* (2013.01); *G06T 7/337* (2017.01); *G06T 7/50* (2017.01); *G06T 2207/20081* (2013.01); *G06T 2207/20084* (2013.01)

(58) Field of Classification Search
CPC ....... G06N 3/04; G06N 3/08; G06F 17/30247
See application file for complete search history.

(56) References Cited

U.S. PATENT DOCUMENTS

2007/0046696 A1    3/2007    Zhang et al.
2014/0132604 A1    5/2014    Bao et al.

OTHER PUBLICATIONS

Jaderberg, Max, Karen Simonyan, and Andrew Zisserman. "Spatial transformer networks." Advances in neural information processing systems. 2015.*
Jaderberg, Max, et al. "Spatial Transformer Networks: Supplementary Material."*
Lin, Chen-Hsuan, and Simon Lucey. "Inverse compositional spatial transformer networks." arXiv preprint arXiv:1612.03897 (2016).*

(Continued)

*Primary Examiner* — Jonathan S Lee
(74) *Attorney, Agent, or Firm* — Joseph Kolodka

(57) ABSTRACT

A computer-implemented method for training a deep learning network is presented. The method includes receiving a first image and a second image, mining exemplar thin-plate spline (TPS) to determine transformations for generating point correspondences between the first and second images, using artificial point correspondences to train the deep neural network, learning and using the TPS transformation output through a spatial transformer, and applying heuristics for selecting an acceptable set of images to match for accurate reconstruction. The deep learning network learns to warp points in the first image to points in the second image.

14 Claims, 4 Drawing Sheets

(56) References Cited

OTHER PUBLICATIONS

Sønderby, S. K., Sønderby, C. K., Maaløe, L., & Winther, O. (2015). Recurrent spatial transformer networks. arXiv preprint arXiv:1509.05329.*

Kar, et al., "Category-Specific Object Reconstruction from a Single Image". Computer Vision and Pattern Recognition, 2015. Cornell University Library, Nov. 22, 2014. pp. 1-9.

* cited by examiner

UNSUPERVISED MATCHING IN FINE-GRAINED DATASETS FOR SINGLE-VIEW OBJECT RECONSTRUCTION

RELATED APPLICATION INFORMATION

This application claims priority to Provisional Application No. 62/250,860, filed on Nov. 4, 2015, incorporated herein by reference in its entirety.

BACKGROUND

Technical Field

The present invention relates to image processing and, more particularly, to unsupervised matching in fine-grained datasets for single-view object reconstruction.

Description of the Related Art

Matching objects of different instances is a critical step in performing single-view object reconstruction. However, this is a challenging task because objects may deform and have different appearances. Because of this, recent approaches in single-view object reconstruction rely on supervised part annotation that provide point correspondences in one way or another. This is not a method that scales, and for reconstruction dense matches are required, which is not only laborsome, but difficult to obtain for parts that do not have any meaningful names for humans to annotate.

SUMMARY

A computer-implemented method for training a deep learning network is presented. The method includes receiving a first image and a second image, mining exemplar thin-plate spline (TPS) to determine transformations for generating point correspondences between the first and second images, using artificial point correspondences to train the deep neural network, learning and using the TPS transformation output through a spatial transformer, and applying heuristics for selecting an acceptable set of images to match for accurate reconstruction.

A system for training a deep learning network is presented. The system includes a memory and a processor in communication with the memory, wherein the processor is configured to receive a first image and a second image, mine exemplar thin-plate spline (TPS) to determine transformations for generating point correspondences between the first and second images, use artificial point correspondences to train the deep neural network, learn and use the TPS transformation output through a spatial transformer, and apply heuristics for selecting an acceptable set of images to match for accurate reconstruction.

A non-transitory computer-readable storage medium comprising a computer-readable program for training a deep learning network is presented, wherein the computer-readable program when executed on a computer causes the computer to perform the steps of receiving a first image and a second image, mining exemplar thin-plate spline (TPS) to determine transformations for generating point correspondences between the first and second images, using artificial point correspondences to train the deep neural network, learning and using the TPS transformation output through a spatial transformer, and applying heuristics for selecting an acceptable set of images to match for accurate reconstruction.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide for a method for matching objects of fine-grained categories without using any part-annotations. The invention relies on a deep learning framework that outputs a mapping that aligns an object in one image to another, referred to as WarpNet. The exemplary embodiments train the network in an unsupervised-discriminative learning approach, where an artificially created dataset with known point correspondences is used to discriminatively train the network. The output of the network acts as a spatial prior for computing matches between two different instances. The matches obtained by the network are robust to changes in appearance, viewpoint, and articulation.

Embodiments of the present invention provide for a method to improve the match quality without using any part annotations for fine-grained categories. One aspect relates to taking advantage of the fine-grained nature of the image collection, where all objects share a common shape by introducing a deep learning framework that learns to warp one object to another. Thus, the network is trained without using any part correspondences.

In addition, the present invention proposes a deep learning framework, referred to as WarpNet, which learns to predict a function that warps points in one image to another. The predicted warps are used as a spatial prior that improves the quality of matches between different instances of fine-grained categories.

The present invention further proposes a method to train the WarpNet without using any point correspondences. This is accomplished by creating an artificial dataset where point correspondences are trivially known. An exemplar-driven approach is then introduced to apply random non-linear transformations to images where a realistic deformation of the objects are to be obtained.

The effectiveness of the method is shown through a series of quantitative evaluations on matching objects on the CUB-200-2011 dataset where the method outperforms previous state-of-the-art approaches despite the fact that no part annotations are used. The matches are applied to produce single-view object reconstructions, where the gap is narrowed between unsupervised and supervised object reconstructions.

Figure 1:
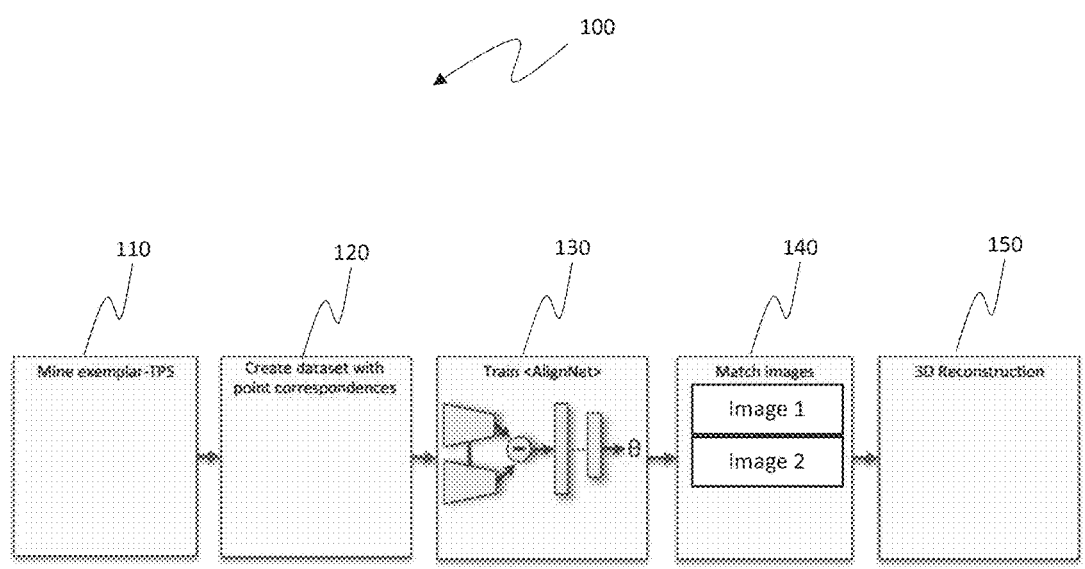
FIG. 1 is a block/flow diagram of a system for training a deep learning network, in accordance with embodiments of the present invention.

Referring now in detail to the figures in which like numerals represent the same or similar elements and initially to FIG. 1, a block/flow diagram of a system for training a deep learning network, in accordance with embodiments of the present invention is presented.

Recently, several deep learning driven approaches have been proposed that learn similarity metric between image patches in a supervised manner. These works focus on matching images of the same instance from various viewpoints, while the focus of the exemplary embodiments of the present invention is on matching deformable objects of different instances with a variety or multitude of appearances. This task requires semantic understanding of object shape and not just local appearance features alone.

It is known that matching or point localization tasks can be improved by augmenting the appearance similarity with some form of spatial prior. Supervised methods often make use of large scale datasets with labeled parts to provide non-parametric prior on the key pointing locations. These priors can even be learned from data, but in all cases they require supervised part annotations during training. Supervised approaches require large scale datasets of point correspondences, which can be laborsome and difficult to obtain. For these reasons, most fine-grained or detection datasets are labeled with sparse part annotations at key semantic parts. For reconstruction, it is desired to obtain a method that can match not only these key semantic parts, but also other points on the foreground.

More closely related to the present approach are methods that use unsupervised spatial prior in solving matching issues. However, these methods do not require any learning and are purely geometric. Recently, studies have proposed an unsupervised approach that computes joint dense alignment of image sets by taking advantage of global-consistency. Further, recent work has explored training a convolutional network to predict dense optical flow, but in a supervised manner. These are all joint pixel alignment methods. However, the exemplary embodiments of the present invention do not perform joint pixel alignment since the objective is reconstruction by identifying key points that match with high confidence.

Single-view object reconstruction is a relatively current issue that makes use of an image collection of similar objects in order to reconstruct a target object from a single view. Seminal work shows that single-view object reconstruction is possible by using the image collection of similar objects as alternate views to reconstruct the target object. Such method is based on, e.g., silhouette hull and uses ground truth part annotation to estimate camera matrices.

The network of the exemplary embodiments of the present invention can be a Siamese network that is used to predict a transformation and directly uses the predicted transformation, as well as its appearance features, to improve matches. Furthermore, the present network implicitly optimizes the parameters using artificial correspondences. The present network only requires silhouettes to be trained, which could be replaced with co-segmentation, and it is only used to create the artificial dataset. Additionally, the network is designed such that it outputs continuous transformation parameters.

The present network is inspired by the recent spatial transformer networks, which introduce a deep learning module that predicts a transformation parameter used to spatially transform the input image. This acts as an attention mechanism, which is implicitly driven by the classification or any task that follows the module. Such concepts are extended further by predicting a warping function that aligns two object instances in an unsupervised manner. The present approach is in line with the recent work, which demonstrated that convolutional networks can be trained without any supervised labels by treating an image patch and its transformed versions as a "surrogate" class. However, the unsupervised training objective of classifying the "surrogate" class was only a pretext for learning good features. In the exemplary embodiments of the present invention, the output of the network trained by an artificial dataset can be generalized to real image pairs.

The present invention presents a deep learning framework (i.e., WarpNet) that learns the correspondence from one image to another without requiring annotations. Given two images I1 and I2, the network outputs a function that takes points in I1 to points in I2. The function is parameterized as a thin-plate spline (TPS) transformation since it can capture shape deformations. Artificial correspondences are generated by applying known transformations on an image. The present approach uses the structure afforded by fine-grained datasets, and dealing with non-rigidity and articulations. The network generalizes well to instances of different categories at test time and the output is used as a spatial prior in computing a match between two objects. FIG. 1 gives an overview of such approach.

The system 100 includes a mining module 110, a point correspondence sampler 120, a training module 130, an image matching module 140, and a 3D reconstruction module 150.

Concerning the mining module 110, to mine exemplar TPS, a pose graph is used that is computed based on conv4 feature similarity. Images within a radius of 3 on the pose graph are considered and their silhouettes are used to compute a TPS transformation based on shape context features. TPS transformation is retained between the 50 and 90 percentiles of bending energy.

Concerning the point correspondence sampler 120, points are sampled on a uniform grid and various exemplar TPS transformations are applied, along with scaling, rotation, and contrast transformations.

Concerning the training module 130, a deep learning architecture consisting of a Siamese network is presented for feature extraction of convolutional layers. The extracted features are subtracted and passed through another series of convolutional layers that output the control points for a TPS transformation between the two instances. The grid coordinates are passed through a TPS layer, which outputs the TPS warp coefficients and then transforms key points from one instance, which are sent to a loss layer that compares them against the key points from another instance.

Concerning image matching module 140, the network outputs matches, which are then filtered through a ratio test between the first and second closest matching points.

Concerning 3D reconstruction module 150, given an input image, matches within the same category and other categories are computed. Images for matching can be selected based on a multitude of heuristics. A virtual view network to propagate the matches across the selected images can be used. The propagated matches can be filtered and the remaining key points can be used for a factorization-based reconstruction.

Figure 2:
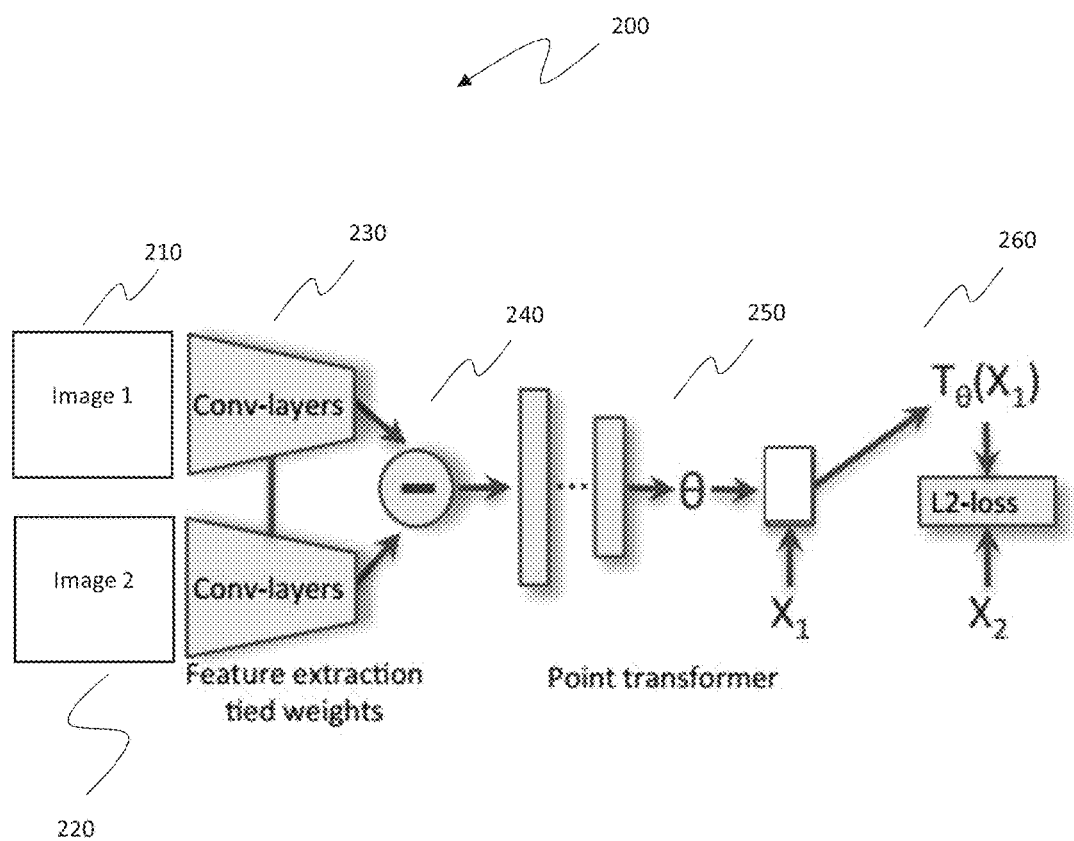
FIG. 2 is a block/flow diagram of a system for producing a function that warps one object to another without using any human-annotated point correspondence, in accordance with embodiments of the present invention.

FIG. 2 is a block/flow diagram of a system for producing a function that warps one object to another without using any human-annotated point correspondence, in accordance with embodiments of the present invention.

Since the methods presented herein do not have annotated point correspondences, artificial point correspondences are created by applying random spatial and chromatic transformations to images. The key requirement is that the spatial transformations applied are complex enough to learn meaningful correspondences, while producing transformed images that are reflective of actual images to be matched at test time. For instance, affine transformations are not expressive enough to capture non-rigid deformations and articulations in certain types of images. Instead, TPS transformations are used to exploit the fine-grained dataset to generate exemplar warps that span a realistic range of transformations.

A pose graph is used whose edge weights are determined by the cosine distance of the fourth layer of a pre-trained ILSVRC (ImageNet Large Scale Visual Recognition Competition) conversion network, which captures abstract concepts such as class-independent shape in a fine-grained dataset. Shape context TPS warps are computed between the silhouettes of every pair of images that are within a radius 3 on the pose graph. The TPS warps are sorted by using the mean of their bending energy and affine energy, retaining only those between the 50th and 90th percentiles to avoid warps that are too drastic or too trivial. The method creates m transformed versions of every image by sampling from this set of TPS warps. All images are cropped at their bounding boxes and resized to s×s. Key points are used and n points are sampled uniformly on the foreground. Thus, images are created by applying transformations sampled from the exemplar-TPS warps. The transformation includes changes in object shape and articulations around various features of objects within images, which validates the utility of exemplar TPS warps.

As noted, the proposed WarpNet is a Siamese network that takes two images related by an exemplar TPS transformation, I1 and I2, along with the corresponding n key point locations, as inputs during training. A Siamese neural network is a class of neural network architectures that contain two or more identical sub-networks. Identical here means they have the same configuration with the same parameters and weights. Parameter updating is mirrored across both sub-networks.

At test time, the input consists only of two images from possibly different categories and poses that must be matched. The main objective of WarpNet is to compute a function that warps points p2 in I2 to image coordinates in I1, such that after warping the L2 distance to the corresponding points p1 in I1 is minimized. FIG. 2 illustrates the architecture 200 of WarpNet, where two images 210, 220 are passed through feature extraction convolution layers 230, and then through a subtractor 240. The feature maps are then passed through another set of convolution layers 250 and are then sent to a TPS layer 260 for further processing, as described below.

As stated above, the input images 210, 220 are passed through feature extraction convolution layers 230 with tied weights. The extracted features are then combined by element-wise subtraction 240 of the feature maps. The method subtracts rather than concatenates the feature maps along the channels, since concatenation significantly increases the number of parameters in the network making it unstable to train. The combined feature maps are passed through another series of convolution layers 250 that output the (x, y) coordinates of a deformed K×K grid, which act as the control points for computing a grid-based TPS transformation from I2 to I1. The output grid is normalized to a range of [−1, 1] in both directions. The grid coordinates are then sent to a TPS layer 260, which estimates the TPS warp coefficients by solving a system of linear equations. Then it applies the TPS transformation to the key points $p_2$ of $I_2$ to generate their transformed versions $T_\theta(p2)$, which finally get sent to the L2 loss layer along with $p_1$.

The TPS coordinates can be computed as follows:

Given a regular grid points $\{x_i\}$ and deformed grid points $(x_0\ i)$, $i=1, \ldots, K2$, the TPS mapping is given by:

$$T_\theta(x) = \sum_{j=0}^{3} a_j \phi_j(x) + \sum_{i=1}^{K^2} w_i U(\|x, x_i\|), \quad (3)$$

$$\text{s.t. } \sum_{i=1}^{K^2} w_i = 0, \sum_{j=1}^{2}\sum_{i=1}^{K^2} w_i x_j = 0,$$

where $\phi 0=1$, $\phi j(xi)=xj$, $U(r)=r^2 \log r^2$. The TPS coefficients $\theta=\{w,a\}$ is given by solving the system of equations:

$$L\theta = x_i', \quad (4)$$

L is non-singular and invertible, which the method only needs to compute once, as the regular grid x is fixed. Thus, this is another linear layer $\theta = L^{-1} x_i'$, with weights $L^{-1}$.

The warp parameters are implicitly trained rather than by direct supervision against the TPS warp coefficients. One reason for this is that the exemplar-TPS warps control points are on the silhouette contours and not defined on a regular grid. But this design choice keeps the network flexible to the kind of supervision required, since the method can still train the network without knowing the exact transformation parameters used.

Given two images Ii and Ij, a match for a point $u_i$ in $I_i$ is the most similar point $v_j$ in $I_j$ using the similarity score consisting of an appearance term and a spatial term:

$$s(u_i, v_j) = \exp\left(\frac{-d_f(u_i, v_j)}{\sigma_f}\right) + \lambda \exp\left(\frac{-d_w(u_i, v_j)}{\sigma_w}\right), \quad (1)$$

where $d_w(u, v)$ is the distance of appearance features extracted at $u_i$ and $v_j$, while $d_w$ is a symmetric spatial prior:

$$d_w(u,v)=0.5(\|x_i{}^u - T_{\theta_{ij}}(x_j{}^u)\| + \|x_j{}^u - T_{\theta_{ji}}(x_i{}^u)\|). \quad (2)$$

The matches are then ranked by the ratio-test strategy. This heuristic allows discarding points in $I_i$ that are similar to many other points in $I_j$. Since the key points are extracted densely on the foreground, the ratio between the first and second nearest neighbors that are at least 10 pixels away is computed.

Obtaining good matches is a critical first step towards 3D reconstruction. While single-view 3D reconstruction methods in the past have relied on expensive supervised inputs such as part annotations or CAD models, the matching method of the exemplary embodiments of the present invention enable a first approach towards a challenging new tasks, namely, unsupervised single-view reconstruction. An overview is provided of how variants of existing supervised methods or SFM (structure from motion) pipelines can be used for unsupervised single-view reconstruction.

As a result, a method has been presented to improve the quality of matches in an unsupervised manner as a step towards fully unsupervised single-view object reconstruction. Obtaining good matches is a critical component of the reconstruction process. The efficacy of the matches is demonstrated below by sending such matches through a structure from a motion pipeline without using any part annotations. For example, the method is evaluated on the CUB-200-2011 dataset (i.e., images of birds).

The present invention follows recent work that proposed a shortest-path based method to propagate matches between objects of similar pose across the entire image collection. This provides denser tracks of key points on the target object, which gets sent to a rigid factorization framework. In the exemplary embodiments of the present invention, the pose graph is used instead of creating a graph based on ground-truth camera matrices obtained through part annotations. The pose graph is computed by using all training and test images including their mirrors.

The first issue encountered is which images to use for reconstructing the target object. In previous works, all images of the same categories were used for reconstruction. However, compared to the "bird" category in PASCAL VOC dataset, which has less than 1000 images, the CUB-200-2011 dataset has 12,000 unique images of birds, with 60 images per sub-categories. Typically, there is not enough viewpoint coverage with 60 images of a single sub-category, yet using all 12,000 images for reconstruction is inefficient and problematic due to the large number of outlier introduced. There are many works devoted in studying how to pick images for reconstruction in a traditional multi-view reconstruction framework, but picking images for single-view object reconstruction of deformable objects presents a further issue. Several simple heuristics were attempted where images of sub-categories that share a same keyword were used (e.g., all "warblers"), or images that are related by a taxonomy, or 5 nearest neighbor sub-categories on a similarity tree of bird species. These heuristics provide comparable results as long as there are images from more than one sub-category. It is an interesting future direction as selecting the right set of images can greatly improves the reconstruction quality.

In the present invention, for a given target object of one particular class, images from several sub-categories are used by implementing heuristics. Then the method computes pairwise matches at 85% precision threshold between all pairs of images whose distance on the pose graph is less than 4. The method ignores matches of image pairs that have less than 50 surviving matches. A virtual view network is then setup to propagate the matches across all the selected images. Propagating a match for point u on the target image, $I_{tgt}$ to another point in $I_j$ consists of solving the shortest path from u to all points in $I_{tgt}$, and picking the point with minimum weight. The method uses scores from equation 1 which is bounded between [0, 1] as weights on the graphs connect the key points.

After the propagation, the method further filters the propagated matches whose shortest path distance is more than 0.4 to avoid spurious matches and remove all images that have less than 30 matches with the target object at this point. The method then creates the measurement matrix of tracked points of the target key points. The method only reconstructs key points that are visible at least in 10% of the images used since otherwise it deteriorates the quality of reconstruction. The observation matrix is then sent to a rigid factorization algorithm of Marques and Costeira which robustly handles missing points.

Figure 3:
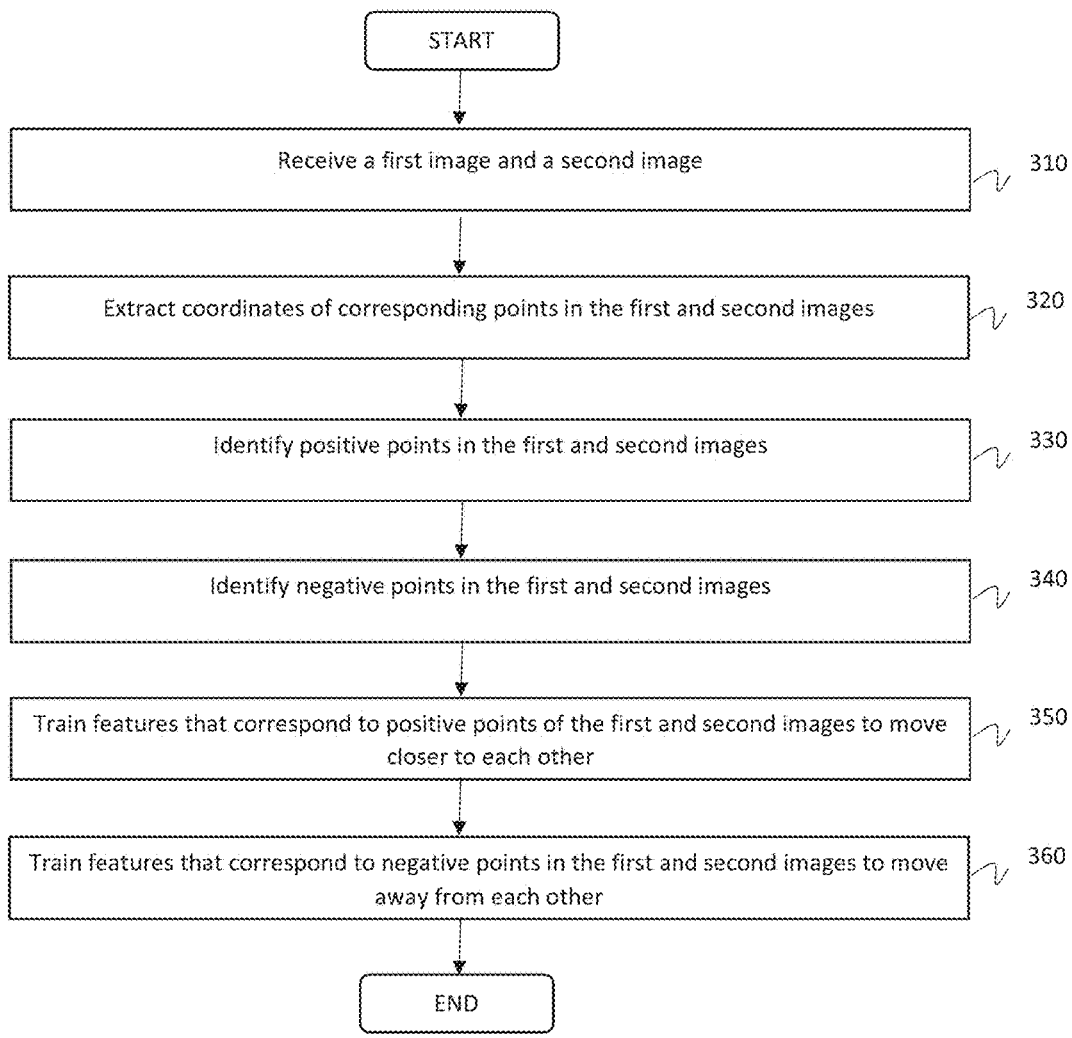
FIG. 3 is a block/flow diagram of a method for training a deep learning network, in accordance with embodiments of the present invention.

FIG. 3 is a block/flow diagram of a method for training a deep learning network, in accordance with embodiments of the present invention.

At block 310, a first image and a second image are received.

At block 320, coordinates of corresponding points in the first and second images are extracted.

At block 330, positive points in the first and second images are identified.

At block 340, negative points in the first and second images are identified.

At block 350, features that correspond to positive points of the first and second images are trained to move closer to each other.

At block 360, features that correspond to negative points in the first and second images are trained to move away from each other.

The advantages of the present invention include mining exemplar TPS to determine transformations for generating point correspondences, using artificial point correspondences to train a deep neural network, learning and using the TPS transformation output through a spatial transformer, and using heuristics for selection of a good or acceptable set of images to match for accurate reconstruction. The advantages further include less labeling and annotation effort, since the method is unsupervised and more accurate matching and reconstruction compared to other unsupervised methods that do not use deep learning.

In experiments, the focus was on obtaining matches for reconstruction without using part annotations. Thus, it is assumed that objects in the dataset have been localized and segmented. All experiments were done on the CUB-200-2011 dataset, which has 11,788 images of 200 bird categories, each labeled with 15 part annotations. The method quantitatively evaluated the matches obtained by using the part annotations as ground truth. The method then analyzed the choice of spatial transformations used for creating the artificial dataset. The efficacy of the framework was demonstrated by using matches to do single-view object reconstructions.

In conclusion, during training, silhouettes were used (obtainable through co-segmentation) to generate exemplar thin-plate spline (TPS) transformations. The exemplar TPS was used to generate artificial point correspondences for uniformly sampled points on a given image, along with standard scaling, rotation, and contrast transformations. A deep learning architecture is further proposed including a Siamese network for feature extraction of convolutional layers. The extracted features are subtracted and passed through another series of convolutional layers that outputs the control points for a TPS transformation between two instances. The grid coordinates are passed through a TPS layer, which outputs the TPS warp coefficients and then transformed key points from one instance, which are sent to a loss layer that compares them against the key points from the other instance.

Moreover, the method improves the quality of matches between objects of fine-grained categories without using any part annotations. The target application is single-view object reconstruction where all current methods rely on some form of part annotation during the reconstruction process. Obtaining good or acceptable matches in an unsupervised manner is a step towards fully unsupervised single-view object reconstruction. The core of the present approach is a novel deep learning framework that predicts a function that warps one object from another. Such network can be trained without using supervised point correspondences. The present approach achieves significant improvements over conventional approaches without using part annotations.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
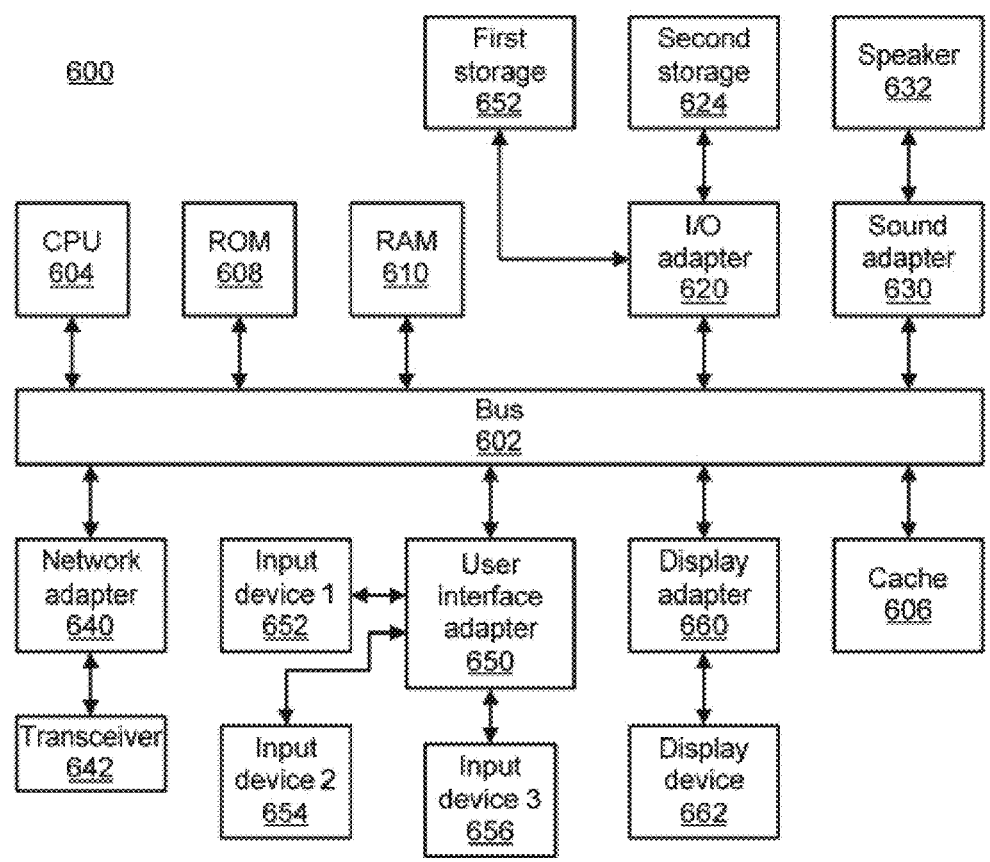
FIG. 4 is a block diagram of a processing system, in accordance with embodiments of the present invention.

Referring now to FIG. 4, an exemplary processing system 600 is shown. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a deep learning network, the method comprising:
receiving a first image and a second image;
mining exemplar thin-plate spline (TPS) to determine transformations for generating point correspondences between the first and second images;
using artificial point correspondences to train the deep neural network;
learning and using the TPS transformation output through a spatial transformer; and
applying heuristics for selecting a set of images to match for accurate reconstruction,
wherein the first and second images are passed through feature extraction convolution layers with tied weights, and
wherein the extracted features are combined by element-wise subtraction of feature maps and subsequently passed through another series of convolution layers for outputting control points for the TPS transformation between an instance of the first image and an instance of the second image.

2. The method of claim 1, wherein the artificial point correspondences are created by applying random spatial and chromatic transformation to the first and second images.

3. The method of claim 1, wherein silhouettes are used to generate the exemplar TPS transformations.

4. The method of claim 1, wherein the deep learning network learns to warp points in the first image to points in the second image.

5. The method of claim 1, wherein the deep learning network matches deformable objects of different instances of the first and second images with different appearances.

6. A system for training a deep learning network, the system comprising:
a memory; and
a processor in communication with the memory, wherein the processor is configured to:
receive a first image and a second image;
mine exemplar thin-plate spline (TPS) to determine transformations for generating point correspondences between the first and second images;
use artificial point correspondences to train the deep neural network;
learn and use the TPS transformation output through a spatial transformer; and
apply heuristics for selecting a set of images to match for accurate reconstruction,
wherein the first and second images are passed through feature extraction convolution layers with tied weights
wherein the extracted features are combined by element-wise subtraction of feature maps and subsequently passed through another series of convolution layers for outputting control points for the TPS transformation between an instance of the first image and an instance of the second image.

7. The system of claim 6, wherein the artificial point correspondences are created by applying random spatial and chromatic transformation to the first and second images.

8. The system of claim 6, wherein silhouettes are used to generate the exemplar TPS transformations.

9. The system of claim 6, wherein the deep learning network learns to warp points in the first image to points in the second image.

10. The system of claim 6, wherein the deep learning network matches deformable objects of different instances of the first and second images with different appearances.

11. A non-transitory computer-readable storage medium comprising a computer-readable program for training a deep learning network, wherein the computer-readable program when executed on a computer causes the computer to perform the steps of:
receiving a first image and a second image;
mining exemplar thin-plate spline (TPS) to determine transformations for generating point correspondences between the first and second images;
using artificial point correspondences to train the deep neural network;
learning and using the TPS transformation output through a spatial transformer; and
applying heuristics for selecting a set of images to match for accurate reconstruction,
wherein the first and second images are passed through feature extraction convolution layers with tied weights,
wherein the extracted features are combined by element-wise subtraction of feature maps and subsequently passed through another series of convolution layers for outputting control points for the TPS transformation between an instance of the first image and an instance of the second image.

12. The non-transitory computer-readable storage medium of claim 11, wherein the artificial point correspondences are created by applying random spatial and chromatic transformation to the first and second images.

13. The non-transitory computer-readable storage medium of claim 11, wherein the deep learning network learns to warp points in the first image to points in the second image.

14. The non-transitory computer-readable storage medium of claim 11, wherein the deep learning network matches deformable objects of different instances of the first and second images with different appearances.

* * * * *